(12) United States Patent
Harrison

(10) Patent No.: US 6,325,885 B1
(45) Date of Patent: Dec. 4, 2001

(54) TEMPORARY PRESSURE-SENSITIVE ADHESIVE

(76) Inventor: Vicki L. Harrison, 2077 Hanscom Dr., South Pasadena, CA (US) 91030

( * ) Notice: Subject to any disclaimer, the term of this patent is extended or adjusted under 35 U.S.C. 154(b) by 0 days.

(21) Appl. No.: 09/348,206

(22) Filed: Jul. 8, 1999

Related U.S. Application Data

(63) Continuation-in-part of application No. 08/905,006, filed on Aug. 11, 1997, now abandoned.

(51) Int. Cl.⁷ .......................................................... C09J 5/00
(52) U.S. Cl. ..................................... 156/306.3; 156/307.3; 156/329
(58) Field of Search ................................... 428/447, 343, 428/355 R, 355 RA; 156/306.3, 307.3, 329

(56) References Cited

U.S. PATENT DOCUMENTS 4,016,328 * 4/1977 Horning ................................. 428/355

* cited by examiner

Primary Examiner—D. S. Nakarani
(74) Attorney, Agent, or Firm—Lewis, D'Amato, Brisbois & Bisgaard, LLP

(57) ABSTRACT

A pressure-sensitive adhesive based on a dimethylpolysiloxane gum for adhering porous and semi-porous substrates. The adhesive has thixotropic properties which permits the viscosity of the adhesive to breakdown when pressure from one substrate is exerted on another substrate which is in a horizontal position in order to allow a temporary adhesion. The adhesive is transparent, has a consistency of a gel, and a viscosity range that controls the flow of the adhesive and provides a bond that can be broken by physical separation of the two substrates.

1 Claim, 1 Drawing Sheet

TEMPORARY PRESSURE-SENSITIVE ADHESIVE

This application is a continuation-in-part of U.S. patent application Ser. No. 08/905,006 filed Aug. 11, 1997 now abandoned.

TECHNICAL FIELD

The invention pertains in general to pressure sensitive adhesives and more particularly to a temporary pressure-sensitive adhesive which provides a temporary bond between an article and a horizontal surface. The adhesive is particularly suitable for temporarily attaching an article such as a vase to a substantially flat surface, such as a glass shelf or fireplace mantel. Once attached the article remains on the surface during an earthquake or other physical movement, thus providing protection for the article.

BACKGROUND ART

Previously many different types of products have been developed for temporarily attaching various articles to a flat surface. Securing articles consists of maintaining an object, such as glassware and statuary, and insuring that the article is secure in the event of an external physical force, such as an unplanned movement, wind or an earthquake that could cause the article to move and subsequently fall and break.

In the past, people have utilized adhesive tape, glue, waxes, putty blends and other like substances to provide a securing means.

Unfortunately, these types of products offered not enough or too much adhesion. Adhesive tape provides good holding strength for paper and other relatively thin, light-weight items but is ineffective for holding articles with more substantial weight. Glue provides an excellent holding and securing means for most articles but, after most glues have dried and set, it is at best difficult if not impossible to move the article without damage to the shelf and/or the article.

Waxes, putty blends and other chemical mixtures attempt to provide a high-strength, non-permanent adhesive for use on many different surfaces. One such adhesive was derived from a pseudoplastic substance, which, when applied to an article, would allow an adhesive bond to form between two surfaces. Initially this type of adhesive appeared to be effective, however after prolonged or repeated use it was determined that the adhesive would lose a substantial amount of its adhesive properties and after an extended period of time become ineffective.

A search of the prior art did not disclose any patents that read directly on the claims of the instant invention, however, the following U.S. patents are considered related:

| U.S. Pat. No. | INVENTOR | ISSUED |
| --- | --- | --- |
| 5,566,031 | Meyr, et at | Oct. 15, 1996 |
| 5,473,005 | Columbus, et al | Dec. 5, 1995 |
| 5,328,696 | Noel | July 12, 1994 |
| 4,460,371 | Abber | July 17, 1984 |
| 4,016,328 | Horning | April 5, 1977 |

The U.S. Pat. No. 5,566,031 discloses a silicone gel composed of crosslinking two-part silicone rubbers causing vulcanization. The gel is used as a transparent sealing tape adhesive for electrical components which permits the sealing of two materials with very different coefficients of thermal expansions improving the adhesion strength due to the elasticity of the gel.

The U.S. Pat. No. 5,473,005 discloses the use of an adhesive gel based on polyvinyl alcohol, which has thixotrophic characteristics for adhering porous and semiporous substrates such as paper, cloth and wood.

The U.S. Pat. No. 5,328,696 discloses a hot-melt silicone pressure sensitive adhesive compositions containing waxes, silicate resins and silicone fluids. It was disclosed that the addition of an organic wax having a melting point between 30° C. and 150° C. decreased the dynamic viscosity of the adhesive at temperatures equal to or below 200° C.

The U.S. Pat. No. 4,460,371 provides a pressure sensitive adhesive formed from a crosslink polymerization of methyl/phenyl siloxane gum, dimethyl siloxane gum and a polysiloxane resin. The resulting product is suitable for adhering a large number of surfaces and has particular utility as an adhesive between plastic film and human skin demonstrating liquid permeability and release characteristics.

The U.S. Pat. No. 4,016,328 discloses a pressure sensitive tape using a silicone resin, silicone gum and a curing agent to produce superior peel strengths. The patent utilizes an admixture of silicone resin and a hydroxyl heat-cured octamethylcyclotetrasiloxane gum, or a chemically-cured dimethylpolysiloxane gum solubilized in xylene to form solutions between 55% to 65% solids. The only similarity between this patent and the instant application is the incorporation of a similar silicone gum, known as dimethylpolysiloxane, which is cited as a component in one of the 25 examples of the adhesive solutions. The performance of the adhesive solution is based on its chemical interaction, whereby the dimethylpolysiloxane gum is "cured" and the adhesive solution is coated onto a two mil etched polytetrafluoropolyethylene film which acts as a carrier for the adhesive to be applied to a surface. In contrast, the applicant's adhesive is based on the inherent adhesive properties of the "uncured" form of the silicone gum, dimethylpolysiloxane, without further additives either chemically or physically. Additionally due to its physical properties, no carrier is necessary for the applied adhesive.

DISCLOSURE OF THE INVENTION

The temporary pressure-sensitive adhesive functions with a polyorganosiloxane gum which inherently offers thixotropic properties. Due to the thixotropic nature of the polyorganosiloxane gum, which is used without any chemical modification, the viscosity of the adhesive will breakdown as it is exposed to gravity and will continue to flow as pressure is exerted. When pressure is released, the adhesive does not return to its original form, and thus on a horizontal surface will flow to form a gel film with adhesive properties for porous, semi-porous and non-porous substrates. The adhesive gel is particularly suitable for securing an article such as a vase to a horizontal surface, such as a shelf or mantle. A bond is produced by the adhesive gel that is sufficient to prevent the article (first substrate) from moving from the horizontal surface (second substrate).

The adhesive gel is transparent and exhibits a wet tack with a low rate of set. This feature allows the first substrate which is in position with the second substrate on a horizontal plane to be repositionable for a limited time prior to the formation of the adhesive bond. The temporary adhesive bond forms with time between the two substrates. Firm pressure on the first or upper substrate ensures good initial adhesion, initiates the viscosity breakdown of the polyorganosiloxane gum, and decreases the time required to achieve a final adhesive bond which temporarily holds the two substrates together.

The adhesive bond is temporary and can be broken by physical stress or a shearing force applied to the first substrate. The adhesive gel can easily be removed from the second substrate surface by rubbing mechanically with a finger of applying adhesive residue with a small quantity of the adhesive.

In view of the above disclosure, it is the primary object of the invention to provide a thixotrophic, adhesive gel based on a polyorganosiloxane gum that provides strong, temporary bond between two substrates of similar or different compositions. It is also an object of the invention to provide a temporary adhesive that:

allows the temporary bond to be broken by physical stress, can be reused, is in the form of a transparent gel which exhibits a wet tack with a low rate of set, can be formed into any shape manually, such as a ball, disc or rod, for application to the substrates, is non-toxic and is not an irritant to the skin and eyes as defined in the Federal Hazardous Substances Act (FHSA), allows surfaces utilizing the adhesive gel to be cleaned with common household cleaners without affecting the adhesive strength, and is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
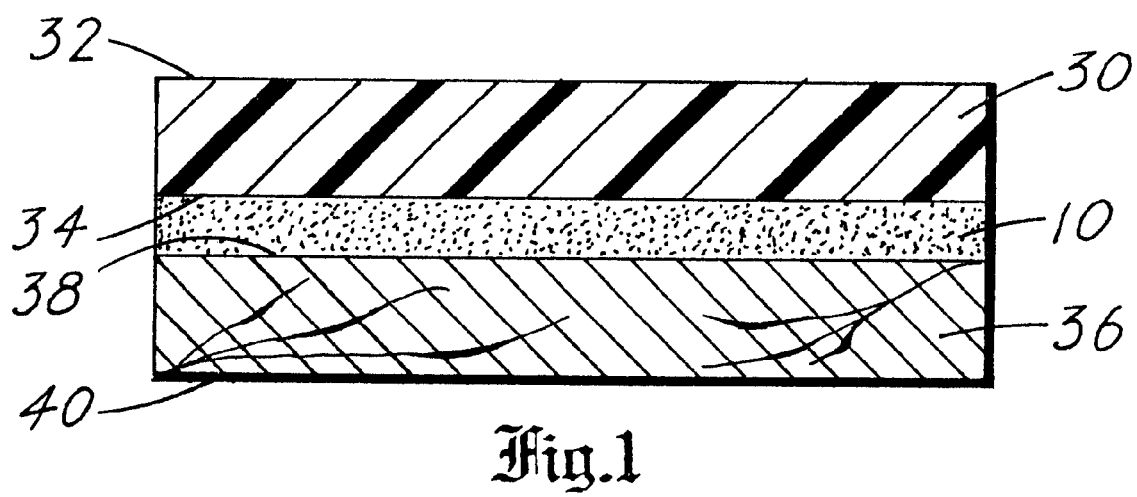
FIG. 1 is a sectional view showing a quantity of adhesive applied between a first substrate and a second substrate.

The best mode for carrying out the invention is presented in terms of a preferred embodiment for a temporary pressure-sensitive adhesive 10 that forms a thixotrophic, silicone-based adhesive gel which temporarily attaches two substrates together. As shown in FIG. 1 the adhesive 10 is placed between the lower surface 34 of an upper or first substrate 30 and the upper surface 38 of a lower or second substrate 36. Various alkylpolyorganosiloxane gums were evaluated as being the single ingredient in the adhesive 10. This invention was thus developed using 100% of each alkylpolyorganosiloxane gum as an adhesive gel. Each can be represented by the average unit formula:

$R^1{}_\alpha SiO_{4-\alpha/2}$ where $R^1$ is a substituted or unsubstituted monovalent hydrocarbon group. The radical group represented by $R^1$ includes, but is not limited to methyl, ethyl, propyl, butyl, pentyl, hexyl, vinyl, allyl, butenyl, pentenyl, hexengyl, phenyl, tolyl, xylyl, naphthyl, cyclopentyl, cyclohexyl, benzyl, phenethyl, 3-cloroproply and 3,3,3-trifloropropyl. The preferred embodiment of the invention uses methyl, vinyl, hydroxyl, or 3,3,3-trifloropropyl groups as the $R^1$ group, which are commercially available. In the preferred embodiment, the $R^1$ group for this invention is a dimethyl group. The α in the above formula is a number from 1.8 to 2.3. The molecular structure of the adhesive 10 includes but is not limited to straight chains, straight chain having some branching, branched structures and mixtures thereof. In the preferred embodiment the molecular structure of the molecules is straight chained.

The adhesive 10 is a high molecular weight polymer that consists mainly of $R_2^1 SiO_{3/2}$ units. The adhesive may contain a small number of $R_3^1 SiO_{1/2}$ units and/or $R_2^1(OH) SiO_{3/2}$ units, as well as other siloxane units. The adhesive may also contain small amounts of $R^1 SiO_{3/2}$ and/or $SiO_{4/2}$ units. The molecular weight for the adhesive, which is known as an alkylpolysiloxane gum, ranges from 250,000 to 1.5MM. The adhesive 10 has an average molecular weight ranging from 400,000 to 800,000. This is determined as a weight average molecular weight distribution (center of distribution).

It should be noted that the adhesive 10 remains in its uncured gum state and in the preferred embodiment, the adhesive 10 is not chemically modified prior to its use as an adhesive. The degree of polymerization for the adhesive 10 ranges from 5,000 to 10,000.

The term "gum" as used herein denotes a high viscosity, e.g. greater than 20,000 centipoise, linear alkyl polysiloxane, that if used without cross-linking agents remains in its highest viscous plastic state. See W. Knoll "Chemistry and Technology of Silicones", Academy Press, New York (1958) p. 387.

The adhesive 10 is a dimethylpolysiloxane gum which is manufactured by and can be purchased from chemical companies, such as Dow Corning Toray Silicone Co., Ltd., Tokyo, Japan, Shincor Silicones Inc., Akron, Ohio and General Electric Co., Waterford, N.Y. The adhesive 10 is commercially sold under the trademark names known as "MUSEUM CLEAR GEL™", "CLEAR QUAKEHOLD GEL™", and "NIC NAC TAC®".

The term "thixotrophic", as used herein, refers to the adhesive's pseudoplasticity. The thixotrophic nature of the adhesive 10 allows it to be removed from a container and be manually formed into shapes for application to one of the substrates 30, 36. The adhesive 10 does not run on a horizontal plane, that is, it will not extensively flow without application of an external force but will flow within a short time due to gravity to form a relative thin film which is self-contained. The adhesive 10 can be described as clear and in the preferred embodiment, the term "clear" includes transparent as well as, translucent.

The first and second substrates 30, 36 may both consist of materials that are porous, or the first substrate 30 may be porous and the second 36 non-porous, or both of the substrates 30, 36 may consist of non-porous materials. Porosity is defined as the ability or lack of ability to absorb water along the surface of a substrate. A nonporous substrate does not absorb, or its surface is impermeable to water, e.g., glass, porcelain, a wide variety of plastics. A semi-porous substrate, due to the nature of its surface can absorb a limited amount of water, e.g., uncoated metal surfaces, painted wood surfaces, stone, concrete surfaces. Porous surfaces, e.g., paper, untreated wood, and cloth absorb water and are less suitable due to partial absorption of the adhesive gel by the substrate's surface.

The chemical composition of the adhesive 10 provides a gel-like consistency, is transparent and has a shelf life of at least five years. The term "gel" or "gel-like" refers to the comparisons of various physical states of chemicals in the liquid state, and is a principle directly related to viscosity. In comparison to water and other solvents, which have a viscosity at 25° C. of no greater than 1 to 1000 centipoise at a temperature of 25° C., gels have a viscosity ranging from 20,000 to 15,000,000 centipoise. Gels, unlike water and similar solvents, will occupy a finite amount of space on a surface. The adhesive 10 also has a viscosity ranging from 20,000 to 15,000,000 centipoise at a temperature of 25° C. However, the preferred viscosity ranges from 25,000 to 10,000,000 centipoise at 25° C. The gel-like consistency allows the adhesive 10, which is normally kept in a shallow container, to be removed in small quantities with a finger tip, or larger amounts with an implement such as a small blade.

The quantity of adhesive 10 to be applied to the first or upper substrate 30 that is set onto the second or lower substrate 36 is determined by solving the following equation:

$$\text{ADHESIVE 10 QUANTITY (grams)} = \frac{\text{WEIGHT OF FIRST or UPPER SUBSTRATE (grams)}}{35}$$

An example of a first substrate 30 would be the weight of a vase onto the secondary substrate 36, such as a glass shelf. The quantity of adhesive 10 can be determined by the weight of the vase, but other factors such as the dimensions of the vase and testing after application for adhesion are important.

The chemical composition of the adhesive 10 exhibits a good wet tack with a low rate of set. These two characteristics allow the first or upper substrate 30 to be longitudinally and laterally re-positioned after the initial placement to locate the final optimal attachment position. The wet tack and rate of set are important criteria for the adhesive's performance. The adhesive 10 can be initially applied to either the first/upper or second/lower substrates 30, 36. With pressure exerted by lightly pressing on the upper substrate 30, the adhesive 10 flows within the plane and confines of the two substrates 30, 36. The weight applied by the first or upper substrate 30 and the force of gravity of time will provide a set adhesion within a finite period of time to the second or lower substrate 36.

The determination of the rate of set was performed on glass surfaces., This test was conducted at 25° C. and 35% relative humidity and it was observed that regardless of the quantity, the adhesive 10 formed an uniform film on a relatively horizontal surface solely due to the force of gravity. Film thickness ranged from 0.100 inches (2.540 mm) to 0.090 inches (2.286 mm) after a period of typically 10–30 minutes. After the initial film was formed for a specific weight of the adhesive 10, a second glass plate was placed on top of the adhesive 10 for 10 minutes with increasing weights. It was observed that a thinner, continuous film was obtained as the quantity of weight increased, thus producing adhesive films ranging from 0.01" (254 mm) to 0.06" (1.524 mm) at a rate of 2:1 weight (in grams) to film thickness, respectively.

The term wet tack is defined as the measure of the "grabbing" strength of the adhesive. After an initial 1.0 gram film of the adhesive 10 was allowed to form on glass, a second glass with a 300.0 g weight was placed on the adhesive film surface. The weighted glass was removed every 30 seconds until film deformation was observed. The grabbing strength was observed after 5 minutes. Up until 5 minutes, the second glass could be lifted off the surface with no film deformation of the adhesive 10.

After the two substrates 30, 36 interface, the adhesive 10 exhibits a chemical and physical inertness to the atmosphere. This inertness enables the adhesive 10 to preserve the initial bonding strength regardless of time or temperature changes. The chemical composition of the adhesive 10 also allows the temporary bond that is formed between the first and second substrates 30, 36 to be released. The release of this temporary bond is accomplished by applying to the first substrate 30 a mechanical force, which is applied at an outward and upward angle relative to the plane of the lower substrate 36. The angle of the applied force is not critical and can range from between 20 to 60 degrees.

To remove the adhesive 10 from either the first or second substrate 30, 36 it is only necessary to manually rub the substrate 30 or substrate 36 with a finger until most of the adhesive 10 has been reclaimed. Any adhesive residue that remains on a substrate 30, 36 can be easily removed by dabbing the residue with a small quantity of the adhesive 10. Upon removal and a visual acknowledgement of no contamination, the adhesive 10 can be reapplied to another substrates. This removal and reattachment does not affect the bonding properties inherent in the adhesive 10.

While the invention has been described in complete detail and pictorially shown in the accompanying drawing it is not to be limited to such details, since many changes and modifications may be made in the invention without departing from the spirit and scope thereof. Hence, it is described to cover any and all modifications and forms which may come within the language and scope of the appended claims.

What is claimed is:

1. A process for utilizing a temporary pressure-sensitive adhesive that when applied between a first or upper substrate and a second or lower substrate forms a bond wherein the composition of said adhesive consists essentially of a silicone gum in the uncured state that further consists of a thixotropic linear alkylpolysiloxane gum, said process consisting essentially of the following steps:

(a) determining the quantity of adhesive in the uncured state that will be required to temporarily attach said first substrate to said second substrate by solving the following formula:

$$\text{Adhesive Quantity (grams)} = \frac{\text{Weight of First Or Upper Substrate (grams)}}{35}$$

(b) attaching the quantity of adhesive in the uncured state determined from the formula to said first substrate, and (c) positioning said first substrate over said second substrate and applying a firm hand pressure, wherein said hand pressure produces a primary adhesive bond, and initiates the viscosity breakdown of said adhesive which ultimately flows to form a final temporary adhesive bond which holds said two substrates together, wherein said article remains on the shelf during an earthquake or other physical movement.

* * * * *